United States Patent Office 3,503,800
Patented Mar. 31, 1970

3,503,800
PROTECTED INSULATED ELECTRICAL CONDUIT
William R. Eddy, Kansas City, Kans., assignor to Phillips Petroleum Company, a corporation of Delaware
No Drawing. Filed Sept. 30, 1966, Ser. No. 583,465
Int. Cl. H01b 17/62, 17/36; B44d 1/42
U.S. Cl. 117—218          5 Claims

ABSTRACT OF THE DISCLOSURE

Materials subject to physical damage and rodent attack, particularly buried electrical cables, are protected by surrounding same with structurally stable foam having rodent repellent dispersed throughout.

---

This invention relates to a method for protecting materials and protected articles. In one aspect material is surrounded with foam having a rodent repellent dispersed therein. In another aspect, rodent repellent is admixed with a foamable composition employed to surround material to be protected. In another aspect, a foamable composition having rodent repellent dispersed therein is foamed in the presence of material to be protected thereby surrounding said material. Material to be buried is supported in the desired position and a foamable composition having rodent repellent dispersed therein is foamed in the presence of said material thereby surrounding the same. In another aspect, an insulated electrical conductor to be buried is protected by surrounding the conductor with structurally stable foam having rodent repellent dispersed therein. In another aspect, an insulated conductor is supported in the position in which it is to be buried and a foamable organic polymeric composition having rodent repellent dispersed therein is foamed in the presence of said conductor thereby surrounding the conductor with structurally stable polymeric organic foam having rodent repellent dispersed therein.

The protection of exposed materials, for example, conduits and electrical conductors is of considerable importance due to the expense of initial installation and maintenance. Such materials particularly buried electrical conductors are subject to weathering, physical damage which might occur, for example, during the backfilling operation and destruction by rodents.

Several approaches have been devised for protecting such materials from destruction. One of the most successful methods employed for protecting buried electrical conduits, for example, is laying the conductor within a metallic sheath or conduit. However, such conduits are subject to chemical attack, are relatively expensive, and require complicated, time consuming installation procedures.

I have found that exposed materials subject to physical damage and rodent attack, for example, insulated electrical conductors and conduits composed of destructible material, can be inexpensively and adequately protected by surrounding the material with an outer sacrificial and/or protective layer of foam having rodent repellent dispersed therein.

It is therefore one object of this invention to provide an improved method for protecting materials. It is another object of this invention to protect buried materials from physical damage. It is another object of this invention to provide an efficient, inexpensive covering for buried conduits. It is another object of this invention to provide a simplified method for protecting buried electrical conductors. It is yet another object of this invention to protect insulated electrical conductors from physical damage and rodent attack.

Other aspects, objects and the several advantages of this invention are apparent to one skilled in the art from a study of this disclosure and the appended claims.

In accordance with one embodiment of this invention material to be buried is protected from physical damage while covering the material or from other sources such as by rodent attack, by surrounding the material with a sufficient thickness of foam having a rodent repellent dispersed therein.

In the presently preferred embodiment of this invention the rodent repellent is admixed with a foamable composition which is then allowed to foam in the presence of the material to be protected thereby completely surrounding the material with a foamed shield containing rodent repellent.

The rodent repellent can be added to the foamable composition as either liquid vapor or solid, although liquid or finely divided particulate solids are preferred due to the ease of handling these materials. Essentially any repellent that can be incorporated into a foamable composition suitable for covering electrical conduits, for example, can be employed within the concept of this invention. The presently preferred repellents are those disclosed by Lyle D. Godhue in U.S. Patent 2,862,850 particularly an N,N-dimethylsulfenyl dithiocarbamate, for example, N,N-dimethyl - S - methylsulfenyl dithiocarbamate and N,N-dimethyl-S-tert-butylsulfenyl dithiocarbamate.

The repellent can be added directly to the foamable composition or if preferred can be dissolved in suitable solvent prior to its incorporation into the foamable composition. Suitable solvents are, for example, xylene, diesel oil, kerosene, fuel oil, etc. Water emulsions or mixed solvent systems can also be employed for this purpose.

The foamable compositions suitable for application within the concept of this invention can be essentially any of the material which can be foamed to surround the structure to be protected. In the presently preferred embodiment of this invention, however, the foamable material can be an organic polymer which is capable of being foamed such as, for example, epoxy resins, polyolefin polymers, asphalt polyesters, urethanes, etc.

The thickness of the foam layer applied to the article to be protected will of course vary depending on the severity of application, the nature of the foaming material, the density of the foam, the degree of protection desired, and other similar factors. When coating insulated conductors it is presently preferred that a thickness of the foam surrounding the conductor be from about 0.1 to about 3 inches, in such applications the presently preferred range of repellent concentration is from about 0.1 to about 20 weight percent based on foamable material.

Essentially any foaming agent, stabilizers and other additives and fillers can be employed in this method with the provision that the additives do not destroy the rodent repellent effect of the finished material.

The foamable composition containing repellent can be applied to the conduits, conductors, etc. the numerous manners. However, the presently preferred method for protecting, for example, conductors which are to be buried, is to apply the sacrificial foam coating containing rodent repellent directly to the element to be concurrently with placing the element in the desired position. For instance, an electrical conduit can be passed through a suitable extruder which performs the function of surrounding the conduit with foamable or foamed material after which it passes directly into excavation. Sufficient time must be provided to allow the foamed composition to set and become structurally stable before covering the conduit in order to avoid destruction of the sacrificial coating and/or damage to the conduit itself.

If desired, a suitable foam-containing rodent repellent can be applied to the article at a facility removed from the location at which the article is to be ultimately utilized. This is particularly true where flexible foamed coatings are employed, in which case the finished article may be handled and stored by conventional means. For example, such articles may be stored and transported on spools from which they may be removed directly for placement at the desired location. Another method for protecting such articles is to support the conductor in the desired position in a suitable excavation and to inject the composition into the excavation at which point it is allowed to foam and harden thereby surrounding and protecting the conductor. This operation can be conducted at the same time that the conductor is being laid after which sufficient time is allowed for the composition to foam and set. The excavation can then be filled without the hazard of damaging the conductive element or insulation.

The application of the concept of this invention is illustrated by the following example.

EXAMPLE

A trench about 30 inches deep and 2–2½ inches wide is made in a commercial trenching operation by means of two caterpillar tractors fastened together in a tandem arrangement and pulling a specially designed plow through the ground. The reel of cable, the tank of liquid polyether containing about 2.5 weight percent rodent repellent, the tank containing the organic polyisocyanate catalyst, and other accessory equipment are located on the rearmost tractor. The cable is led to the bottom rear area of the plow by suitable guides and passes through a mixing nozzle positioned in this area. When the tractors are in forward motion and the plow is in the ground, the operator actuates remote control valves which allow the polyether and catalyst, which are under pressure, to flow through lines to the mixing nozzle. The foam thus produced coats the cable with a protective sheath about one inch thick as it passes through the nozzle. The foam soon hardens, and backfilling of the trench is started quickly.

Numerous variations and modifications are possible within the scope of the foregoing disclosure and the appended claims to the invention, the essence of which is that materials subject to physical damage and/or rodent attack are protected from such damage by surrounding the material with a structurally stable foam having rodent repellent dispersed therein.

I claim:

1. A protected article comprising insulated electrical conductor to be protected surrounded by a structurally stable foamed organic polymer of sufficient thickness to protect said insulated electrical conductor, said foam having rodent repellent dispersed therein.

2. The article as defined in claim 1 wherein said thickness is from about 0.1 to about 3 inches and said repellent is dispersed throughout said foam in an amount of from about 0.1 to about 20 weight percent based on said foam.

3. The article as defined in claim 1 wherein said foamed organic polymer is a polyurethane.

4. The article as defined in claim 1 wherein said rodent repellent is a N,N-dimethylsulfenyl dithiocarbamate.

5. The article as defined in claim 4 wherein said rodent repellent is N,N-dimethyl-S-methylsulfenyl dithiocarbamate or N,N-dimethyl-S-tert-butylsulfenyl dithiocarbamate.

References Cited

UNITED STATES PATENTS

| | | |
|---|---|---|
| 2,753,276 | 7/1956 | Brochhagen et al. |
| 2,822,295 | 2/1958 | Barrett et al. _____ 117—232 |
| 2,822,296 | 2/1958 | Barrett et al. _____ 117—232 |
| 2,862,850 | 12/1958 | Goodhue _____ 424—300 |
| 2,866,722 | 12/1958 | Gensel et al. _____ 117—72 |
| 2,981,631 | 4/1961 | Nagel _____ 117—21 |
| 2,993,813 | 7/1961 | Tischbein. |
| 3,032,827 | 5/1962 | Schaffer _____ 117—18 |
| 3,045,709 | 7/1962 | Rapp _____ 117—18 |

WILLIAM D. MARTIN, Primary Examiner

R. M. SPEER, Assistant Examiner

U.S. Cl. X.R.

61—72.1; 117—232